United States Patent

Jobbins et al.

[11] Patent Number: 5,817,212
[45] Date of Patent: *Oct. 6, 1998

[54] DEINKING COMPOSITION AND PROCESS

[75] Inventors: Jill Marie Jobbins, Freehold; Gary Richard Asbrand, Jr., Trenton, both of N.J.

[73] Assignee: Rhodia Inc., Cranbury, N.J.

[*] Notice: The term of this patent shall not extend beyond the expiration date of Pat. No. 5,807,464.

[21] Appl. No.: 798,575

[22] Filed: Feb. 10, 1997

Related U.S. Application Data

[63] Continuation-in-part of Ser. No. 356,695, Dec. 15, 1994, abandoned.

[51] Int. Cl.$^6$ .................................................. D21C 5/02
[52] U.S. Cl. ........................... 162/5; 162/4; 162/72; 435/278
[58] Field of Search .............................. 162/4, 5, 5 B, 162/72, 72 B; 252/174.2; 435/277, 278

[56] References Cited

U.S. PATENT DOCUMENTS

| | | | |
|---|---|---|---|
| 4,561,933 | 12/1985 | Wood et al. | 162/5 |
| 4,618,400 | 10/1986 | Wood et al. | 162/5 |
| 4,666,558 | 5/1987 | Wood et al. | 162/5 |
| 5,225,046 | 7/1993 | Borchardt | 162/5 |
| 5,227,019 | 7/1993 | Borchardt | 162/6 |
| 5,231,022 | 7/1993 | Saito et al. | 435/209 |
| 5,248,388 | 9/1993 | Richmann et al. | 162/5 |
| 5,258,099 | 11/1993 | Borchardt | 162/5 |
| 5,364,501 | 11/1994 | Baret et al. | 162/5 |
| 5,417,808 | 5/1995 | Okamoto et al. | 162/5 |

FOREIGN PATENT DOCUMENTS

| | | |
|---|---|---|
| 59-9299 | 1/1984 | Japan . |
| 2231595 | 11/1990 | United Kingdom ............. D21C 5/02 |
| WO 93/21376 | 10/1993 | WIPO . |
| 9514807 | 1/1995 | WIPO . |

OTHER PUBLICATIONS

Ken Patrick, "Paper Recycling . . . and Technology", Miller Freeman, pp. 131–134, 154–158, 1991.
Loreen Ferguson, "Deinking Chemistry", Tappi Journal, pp. 75–83, Jul. 1992.
Jeffries, T. W. "Comparison of enzymes . . . –Printed Paper", Apr. 1994, Tappi Journal, vol. 77, No. 4, pp. 173–179.

*Primary Examiner*—Stanley S. Silverman
*Assistant Examiner*—Dean T. Nguyen
*Attorney, Agent, or Firm*—Andrew M. Solomon

[57] ABSTRACT

This invention relates to the deinking process for office wastepaper for utilization in a neutral medium. Particularly the invention relates to a deinking process for office wastepaper comprising the steps of: (a) converting wastepaper to pulp; (b) contacting the pulp with a deinking agent comprising of: i) an enzyme active at a pH of from about 4 to about 9 and ii) a nonionic surfactant selected from the group consisting of higher aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher alcohol polyethylene polypropylene block or random adducts and mixtures thereof; in an aqueous medium having a pH of from about 4 to about 9; and (c) removing ink from the pulp by flotation, water washing or a combination of flotation and water washing.

11 Claims, 4 Drawing Sheets

DEINKING COMPOSITION AND PROCESS

This application is a continuation-in-part of application Ser. No. 08/356,695, filed Dec. 15, 1994, now abandoned.

TECHNICAL FIELD

This invention relates generally to the deinking of office wastepaper. In particular, the invention relates to a deinking process for office wastepaper suitable for utilization in a neutral medium.

BACKGROUND OF THE INVENTION

Wastepaper has long served as a source of raw fiber material for papermaking. It has been standard practice in the art to reclaim wastepaper to allow the reclaimed paper fibers to be used as part or all of the stock of subsequent production of a variety of paper and paperboard products. Today, greater utilization of reclaimed fiber has provided incentive for taking steps to upgrade the reclaimed product. These steps include treatment to effectively remove ink from waste fibers in order to permit their use in the manufacture of newsprint and high quality papers. Increasing amounts of office wastepaper are becoming available with the increased participation by businesses in recycling. Because of the high quality cellulose fiber in office wastepaper, efficient ink removal is particularly desirable since excellent quality, high value products such as office stationery can be prepared.

In the course of conventional paper reclamation, deinking procedures include steps for converting the wastepaper to pulp and contacting the pulp with an alkaline aqueous deinking medium containing a chemical deinking agent. The physical pulping and the alkalinity of the aqueous medium cause the partial removal of ink from the pulp fiber. The deinking agent completes this removal and produces an aqueous suspension and/or dispersion of the ink particles. The resulting mixture is subsequently treated to separate the suspended/dispersed ink from the pulp. This separation may be by flotation and/or washing techniques known in the art.

Conventional deinking chemicals comprise a complex mixture of chemicals, e.g., sodium hydroxide, sodium silicate, chelating agents, hydrogen peroxide, surfactants, dispersants, collector chemicals and agglomeration chemicals. Generally, including a significant amount of alkaline material is standard in the art. It is believed that the alkaline material is needed for good saponification and hydrolysis of the ink resins as well as enhancement of fiber flexibility. The pH of the pulp during the deinking process is usually from about 9.5 to about 11. Exposing the cellulosic fibers to this degree of alkalinity tends to cause yellowing of the fibers; so, it is generally necessary to add an oxidative or reductive bleaching agent such as peroxide, formamidine sulfuric acid or sodium hydrosulfite. The use of this complex and highly alkaline mixture of chemicals is undesirable since the liquor that results from the deinking process presents significant environmental disposal problems.

There is a need for a method of deinking that operates under slightly acidic to slightly alkaline or preferably neutral pH conditions and utilizes a simple combination of chemicals. Such a method could result in waste liquors with significantly reduced disposal problems. Conventional processes have not been particularly successful in specific application to xerographically printed and laser printed paper found in office wastepaper. The difficulty encountered in the deinking of these fused toner papers (laser and Xerox produced) has been attributed to the character of the electrostatic ink, specifically to the binder, which is fundamentally different from that used in other printing processes. For example, in distinction to the common oil or resin binders of other inks, the electrostatic ink binder is typically a polymeric material, e.g., polystyrene and polybutadiene, which during the printing process is fixed to the paper by application of pressure and heat. It is the ink-fusing action of the copier or laser printer that upon repulping results in large, plate-like structures which are typically too large to be removed by washing or flotation and too flat to be removed by screens and cleaners. The approach that several chemical companies have taken is to chemically modify the surface of the toner flakes such that agglomeration will occur. The substantially larger particles will then be removed by slotted pressure screens and forward centrifugal cleaners. The necessity of altering the structure of the ink particles, by comparison, is not a consideration when deinking stock other than office wastepapers (i.e., newsprint, magazine stock and the like). As discussed above, such conventional deinking stock contains ink which is already in fine particulate form, which makes it relatively easy to remove by flotation or combination flotation/washing procedures.

Surprisingly a deinking agent has been discovered which is suitable for use in a medium having a pH of from slightly acidic (about 4) to slightly alkaline (about 9), or preferably neutral medium. The deinking agent is effective in the treatment of office wastepaper by providing reclaimed pulp fiber having a high degree of dirt removal and good brightness. A process for deinking office wastepaper utilizing the deinking agent has been discovered which provides excellent ink and dirt removal as well as good brightness. The deinking agent can also be utilized in a conventional flotation deinking system and/or washing deinking system with little or no modification. Further, a complex mixture of chemicals is unnecessary when utilizing the deinking process and deinking agent of the present invention. More specifically, the deinking agent of the present invention causes the large ink plate-like structures to be reduced to small particles so that the particles can be removed by flotation or a combination of flotation and wash steps. Up until the present invention, it is not believed that the transformation of the ink into small particulate form has been known or suggested by the use of the deinking agents taught herein.

All percentages and ratios given are on a weight basis unless otherwise indicated.

SUMMARY OF THE INVENTION

The present invention relates to a deinking process for office wastepaper comprising the steps of:
  a) converting wastepaper to pulp;
  b) contacting the pulp with a deinking agent comprising:
    i) an enzyme active at a pH of from about 4 to about 9; and
    ii) a nonionic surfactant selected from the group consisting of higher aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher alcohol polyethylene polypropylene block or random adducts and mixtures thereof;
    in an aqueous medium having a pH of from about 4 to about 9;
  c) removing ink from the pulp by flotation, water washing or a combination of flotation and water washing.

DETAILS OF THE INVENTION

Definitions:

As used herein, "alkyl" means a carbon-containing chain which can be straight, branched or cyclic; substituted (mono- or poly-) or unsubstituted; and saturated or unsaturated.

As used herein, "comprising" means that other steps and other ingredients which do not affect the end result can be added. This term encompasses the terms "consisting of" and "consisting essentially of."

As used herein, "enzyme" comprises multi-enzyme complexes and mixtures of enzymes.

As used herein, "fatty alcohol(s)" comprises primary, secondary and tertiary, straight-chain or branched alcohols, preferably primary, straight-chain alcohols. Alcohols suitable for use include coconut fatty alcohols, tallow fatty alcohols, animal tallow fatty alcohols and mixtures thereof. Also, stearyl fatty alcohols, oleyl fatty alcohols, palmityl fatty alcohols and arachidyl fatty alcohols can be used individually or in blends. They can be prepared synthetically or can be derived from natural oils. Preferred for use are straight-chain primary alcohols with from about $C_8$ to about $C_{22}$ alkyl groups.

As used herein, "office wastepaper" means used papers comprising xerographically printed and laser printed paper preferably comprising a majority (generally greater than about 70%) and more preferably comprising all xerographically printed or laser printed paper.

As used herein, "paper" is generic to cellulosic sheet materials including filled and unfilled papers and paperboard.

THE INVENTION

The deinking agent for use in the deinking method of the present invention comprises an enzyme having activity, preferably optimal activity, at a pH range of from slightly acidic (about 4) to slightly alkaline (about 9) and a nonionic surfactant.

An enzyme suitable for use is active (in an aqueous medium) at a pH of generally from about 4 to about 9, preferably from about 4 to about 8, more preferably from about 5.5 to about 7.5, even more preferably from about 6 to about 7 and most preferably from about 6.5 to about 7. The enzyme is characterized by its ability to modify and/or breakdown cellulosic or cellulose-bonded matter.

Examples of suitable enzymes include cellulase derived from animals, plants, bacteria and fungi such as those produced by the fungi, *Aspergillus niger, Trichoderma virde* and *Thielatia terrestris*, Humicola and Bacillus. Preferred enzymes for use are cellulase enzymes. Multi-enzyme complexes that are substantially cellulases are also preferred.

Commercially marketed products preferred for use include:

a) DENIMAX™ (CAS Number and name: 9012-54-8, cellulase), produced by NOVO NORDISK BIOINDUSTRIALS, INC., which is a stabilized liquid endo-glucanase obtained by submerged fermentation of a non-pathogenic mould having an activity of about 100 EGLU/ml (approximately 80 cmu/g as determined by Novo Assay method, AF275) and a pH range of from about 3.8 to about 8 and an optimal pH of from about 6 to about 8; and b) SP342™, (CAS number and name: 9012-54-8, cellulase), produced by NOVO NORDISK BIOINDUSTRIALS, INC., which is a multi-enzyme complex, a mixture of cellulases and hemicellulases where cellulases comprise the majority of the catalytic activity. The complex is active within a pH range of from about 3.8 to about 8.

Preferred enzymes for use have little or no endocellulase activity (less than or equal to about 0.01 $\mu$g/g) as measured by Avicellase assay. This assay is standard in the art and is a measure of activity towards an insoluble cellulose substrate, where the activity is an expression of the amount of cellulose solubilizing power. The limit of detection is approximately about 0.001 $\mu$g/g.

Nonionic surfactants suitable for use are higher (greater than $C_8$) aliphatic alcohol alkoxylates, aliphatic acid alkoxylates, higher aromatic alcohol alkoxylates, fatty acid amides of alkanolamines, fatty acid amide alkoxylates, propylene glycol alkoxylates, propylene glycol alkoxylates, block or random copolymers of ethylene and propylene oxide, higher (greater than $C_8$) alcohol polyethylene polypropylene block or random adducts and mixtures thereof.

Preferred nonionic surfactants are selected from the group consisting of:

1) a fatty alcohol having a carbon number of from about 8 to about 22, alkoxylated with ethylene oxide and propylene oxide of the formula $R$—$O$—$(CH_2CH_2O)_x$—$(CH_2CH(CH_3)$—$O)_y$—$H$;

wherein R is a straight-chain or branched alkyl group having a carbon number of from about 8 to 22; x represents the number of oxyethylene groups per molecule and is in the range of from about 5 to about 25; and y represents the number of oxypropylene groups per molecule and is in the range of from about 2 to about 10, examples of commercially available products are InkMaster™ and Antarox® products sold by Rhône-Poulenc Inc.;

2) a fatty alcohol having a carbon number of from about 8 to about 22, alkoxylated with ethylene oxide and propylene oxide of the formula:

$R$—$O$—$(CH_2CH_2O)_x$—$(CH_2CH(CH_3)$—$O)_y$—$(CH_2CH_2O)_x$—$(CH_2CH(CH_3)$—$O)_y$—$H$;

wherein R is a straight-chain or branched alkyl group having a carbon number of from about 8 to about 22; x represents the number of oxyethylene groups per molecule and is in the range of from about 2 to about 25; and y represents the number of oxypropylene groups per molecule and is in the range of from 0 to about 10, examples of commercially available products are InkMaster™ products sold by Rhône-Poulenc Inc.;

3) a fatty acid having a carbon number of from about 8 to about 22, alkoxylated with ethylene oxide and propylene oxide of the formula:

wherein R is a straight-chain or branched alkyl group having a carbon number of from about 8 to about 22; x represents the number of oxyethylene groups per molecule and is in the range of from about 3 to about 25; and y represents the number of oxypropylene groups per molecule and is in the range of from about 2 to about 15, examples of commercially available products are Lionsurf®, Nonatell®, Hipochem®, and Berocell® products sold respectively by Lion Industries, Inc., Shell Oil Company, High Point Chemical Corp. and EKA Nobel AB;

4) an aromatic alcohol such as phenol having alkyl chain(s) with a carbon number of from about 8 to about 20, alkoxylated with ethylene oxide of the formula:

wherein R and R' is H or an alkyl group and the alkyl is branched or straight-chain having a carbon number of from about 8 to about 14; x is the number of oxyethylene groups per molecule and is in the range of from about 1 to about 20, examples of commercially available products are InkMaster™, Igepal®, and Alkasurf®, products sold by Rhône-Poulenc Inc.;

5) a fatty amide of alkanolamide of the formula:

wherein R' and R" are H or $CH_2CH_2OH$ or $CH_2CH(CH_3)$—OH and R is a fatty alkyl group having a carbon number of from about 8 to about 20, examples of commercially available products are Alkamide® products sold by Rhône-Poulenc Inc.;

6) an alkoxylated fatty acid amide of alkanolamide of the formula:

wherein R is a fatty alkyl group having a carbon number of from about 8 to about 20; and x represents the number of oxyethylene groups per molecule and is in the range of from about 2 to about 10, examples of commercially available products are Alkamide® products sold by Rhône-Poulenc Inc.;

7) a propylene glycol alkoxylate of the formula:

wherein o and p are the number of oxyethylene groups per molecule and are in the range of from about 3 to about 15 and m is the number of oxypropylene groups per molecule and is in the range of from about 25 to about 40, examples of commercially available products are Antarox® products sold by Rhône-Poulenc Inc. and products having a CTFA designation of Poloxamer;

8) a block or random copolymer of ethylene and propylene oxide of the formula:

wherein m and n are the number of oxypropylene groups per molecule and are in the range of from about 10 to about 25 and p is the number of oxyethylene groups per molecule and is in the range of from about 5 to about 25, examples of commercially available products are Antarox® products sold by Rhône-Poulenc Inc. and prouducts having a CTFA designation of Meroxopol;

9) an ethoxylated fatty acid, glycol and polyethylene glycol esters of the formula:

wherein R is a fatty alcohol of greater than $C_8$; $R^1$ is alkyl of greater than $C_8$ or H; and x represents the number of oxyethylene groups per molecule and is in the range of from about 5 to about 200, examples of commercially available products are Alkamus® products sold by Rhône-Poulenc Inc. and products having a PEG castor oil CTFA designation; and 10) an ethoxylated fatty alcohol of the formula:

wherein R is a fatty alcohol; and x represents the number of oxyethylene groups per molecule and is in the range of from about 1 to about 20, examples of commercially available products are Rhodasurf® products sold by Rhône-Poulenc Inc.

More preferred nonionic surfactants are selected from the group consisting of:

1) a fatty alcohol having a carbon number of from about 16 to about 20, alkoxylated with ethylene oxide and propylene oxide of the formula wherein R is a straight-chain or branched alkyl group having a carbon number of from about 16 to 20, x represents the number of oxyethylene groups per molecule and is in the range of from about 10 to about 20, and y represents the number of oxypropylene groups per molecule and is in the range of from about 4 to about 8;

2) a fatty alcohol having a carbon number of from about 16 to about 20, alkoxylated with ethylene oxide and propylene oxide of the formula:

wherein R is a straight-chain or branched alkyl group having a carbon number of from about 16 to about 20, x represents the number of oxyethylene groups per molecule and is in the range of from about 4 to about 10, and y represents the number of oxypropylene groups per molecule and is in the range of from about 1 to about 5;

3) a fatty acid having a carbon number of from about 12 to about 18, alkoxylated with ethylene oxide and propylene oxide of the formula:

wherein R is a straight-chain or branched alkyl group having a carbon number of from about 12 to about 18, x represents the number of oxyethylene groups per molecule and is in the range of from about 3 to about 25, and y represents the number of oxypropylene groups per molecule and is in the range of from about 2 to about 15;

4) an aromatic alcohol such as phenol having alkyl chain(s) with a carbon number of from about 8 to about 14, alkoxylated with ethylene oxide of the formula:

wherein R and R' is H or an alkyl group and the alkyl is branched or straight-chain having a carbon number of from about 8 to about 14 and x is the number of oxyethylene groups per molecule and is in the range of from about 8 to about 12;

5) a fatty amide of alkanolamide of the formula:

wherein R' and R" are H or $CH_2CH_2OH$ or $CH_2CH(CH_3)$—OH and R is a fatty alkyl group having a carbon number of from about 8 to about 14;

6) an alkoxylated fatty acid amide of alkanolamide of the formula:

where in R is a fatty alkyl group having a carbon number of from about 8 to about 14 and x represents the number of oxyethylene groups per molecule and is in the range of from about 4 to about 8;

7) a propylene glycol alkoxylate of the formula:

wherein o and p are the number of oxyethylene groups per molecule and are in the range of from about 3 to about 15 and m is the number of oxypropylene groups per molecule and is in the range of from about 25 to about 40;

8) a block or random copolymer of ethylene and propylene oxide of the formula:

wherein m and n are the number of oxypropylene groups per molecule and are in the range of from about 10 to about 25 and p is the number of oxyethylene groups per molecule and is in the range of from about 5 to about 25;

9) an ethoxylated fatty acid, glycol and polyethylene glycol esters of the formula:

wherein R is a fatty alcohol of greater than $C_8$; $R^1$ is alkyl of greater than $C_8$ or H; and x represents the number of oxyethylene groups per molecule and is in the range of from about 8 to about 30; and 10) an ethoxylated fatty alcohol of the formula:

wherein R is a fatty alcohol and x represents the number of oxyethylene groups per molecule and is in the range of from about 1 to about 20

The most preferred nonionic surfactants are selected from the group consisting of:

1) a fatty alcohol having a carbon number of from about 16 to about 20, alkoxylated with ethylene oxide and propylene oxide of the formula $$R—O—(CH_2CH_2O)_x—(CH_2CH(CH_3)—O)_y—H;$$

wherein R is a straight-chain or branched alkyl group having a carbon number of from about 16 to 20, x represents the number of oxyethylene groups per molecule and is in the range of from about 10 to about 20, and y represents the number of oxypropylene groups per molecule and is in the range of from about 4 to about 8;

2) a fatty alcohol having a carbon number of from about 16 to about 20, alkoxylated with ethylene oxide and propylene oxide of the formula:

wherein R is a straight-chain or branched alkyl group having a carbon number of from about 16 to about 20, x represents the number of oxyethylene groups per molecule and is in the range of from about 4 to about 10, and y represents the number of oxypropylene groups per molecule and is in the range of from about 1 to about 5;

3) an aromatic alcohol such as phenol having alkyl chain(s) with a carbon number of from about 8 to about 14, alkoxylated with ethylene oxide of the formula:

wherein R and R' is H or an alkyl group and the alkyl is branched or straight-chain having a carbon number of from about 8 to about 14 and x is the number of oxyethylene groups per molecule and is in the range of from about 8 to about 12;

4) a fatty amide of alkanolamide of the formula:

wherein R' and R" are H or $CH_2CH_2OH$ or $CH_2CH(CH_3)$—OH and R is a fatty alkyl group having a carbon number of from about 8 to about 14; and 5) an alkoxylated fatty acid amide of alkanolamide of the formula:

wherein R is a fatty alkyl group having a carbon number of from about 8 to about 14 and x represents the number of oxyethylene groups per molecule and is in the range of from about 4 to about 8.

The deinking agent is to be applied to wastepaper which is in the form of a pulp, that is, to wastepaper which has first been substantially reduced to individual fibers. Thus the first step in the process of the present invention is to convert wastepaper to a pulp. Pulping can be conducted using any of the various conventional processes and equipment designed for this purpose. Most conveniently, the wastepaper process feedstock is treated in a device known as a "hydrapulper," which produces a slurry of the fibers in water. Preferably the pulping is conducted in a neutral medium. Most preferably, it is conducted without the use of chemical additives, i.e., with only the use of water.

In accordance with the invention, the use of the combination of nonionic surfactant and enzyme for treatment of office wastepapers causes a transformation in the size of the ink particles detached from the surface of the wastepapers after pulping. The ink particles which are initially present on the surface of the office wastepapers typically have a mean particle size of at least 250 microns. The treatment according to the present invention causes the particle size of the ink detached from the surface of the wastepapers to be reduced so that at least 85 percent of the ink detached has been physically altered so that its particle size after pulping is between about 50 and about 225 microns, more preferably so that at least 90 percent of the ink detached d has been physically altered so that its particle size after pulping is between about 50 and about 225 microns, and most preferably so that at least 95 percent of the ink detached has been physically altered so that its particle size after pulping is between about 50 and about 225 microns. Ink particles having this size profile are considered ideal candidates for removal from the process via flotation or flotation/water washing procedures.

Once the particle size of the ink has been sufficiently reduced after pulping so that the range is predominantly between about 50 and about 225 microns, the ink can be easily removed by flotation or flotation/washing procedures. The higher percentage of particles falling within this range directly correlates to higher levels of dirt removal during the entire deinking process. Accordingly, high quality deinked fiber can be obtained from office wastepaper. This results is considered surprising and beyond the ordinary skill of the artisan.

After the pulping step, the resulting fibers are contacted in an aqueous medium with the deinking agent. This contact step can suitably be conducted in the pulping equipment, for instance, by simply adding the deinking agent to the aqueous slurry of the equipment used to pulp the wastepaper, e.g., hydrapulper. Alternatively, the contact may be carried out using separate processing equipment which provides for agitation and temperature control of the aqueous pulp slurry.

For the contact step, a sufficient amount of enzyme is utilized to achieve an efficient diffusion rate such that substantially all of the pulp fiber (generally greater than about 70%, preferably greater than about 80% and most preferably greater than about 90%) comes into contact with the enzyme component. Determining a sufficient amount is within the skill of an artisan. The amount of enzyme is generally in the range of from about 0.007% to about 0.056%, preferably from about 0.018% to about 0.029%, and most preferably from about 0.020% to about 0.027%, by weight.

A sufficient amount of nonionic surfactant is utilized to achieve appropriate interaction with the enzyme to achieve the synergistic effect. Determining a sufficient amount is within the skill of an artisan. Generally, the range is from about 0.02% to about 0.25%, preferably from about 0.035% to about 0.075% and most preferably from about 0.04% to about 0.1%, by weight.

The efficiency of the deinking agent can be significantly influenced by the pH of the pulp slurry during the contact step. Fluctuations in the pH can result in deactivation of the enzyme component of the deinking agent. During addition of the deinking agent and the activation period the pulp slurry can have a pH ranging from about 4 to about 9, preferably about 4 to about 8, more preferably from about 5.5 to about 7.5, even more preferably from about 6 to about 7, and most preferably from about 6.5 to about 7. A neutral pH is preferred. The pulp slurry pH is to be consistent with the activity pH range of the enzyme, preferably the optimal activity pH range of the enzyme. The incorporation of buffering materials such as sodium citrate or sodium phosphate to maintain an appropriate pH is preferred.

It is important to maintain an appropriate pulp slurry temperature during the contact step. The temperature is to be consistent with the activity temperature range, preferably the optimal activity temperature range, for the enzyme component of the deinking agent. Fluctuations in temperature can deactivate/denature the enzyme component. Determining the appropriate temperature range is within the skill of an artisan. Generally the range is from about 40° C. to about 65° C., preferably from about 45° C. to about 60° C. and most preferably from about 52° C. to about 58° C.

The activation period for the deinking agent is the time needed to allow substantially all of the paper fibers in the pulp slurry to come into contact with the deinking agent. Conditions such as the degree of dilution of the pulp slurry and the utilization of agitation can effect the amount of time needed. The determination of the appropriate amount of time needed is within the skill of an artisan. Generally, the activation period can range from about 5 to about 90, preferably from about 10 to about 60 and most preferably from about 15 to about 30 minutes.

The enzyme and nonionic surfactant components of the deinking agent are prepared by conventional means. The enzyme and nonionic surfactant can be combined by mixing prior to addition to the pulped wastepaper slurried in water or the components can be added and mixed into the slurry in any order of addition.

In addition to water, pulp and deinking agent, the contact slurry may further comprise substances conventionally employed in deinking processes, e.g., brighteners, solvents, antifoam agents and water softeners. The use of additional deinking agents is neither necessary nor preferred.

The overall deinking process generally comprises pulping or maceration of the wastepaper and ink removal by a flotation system, a water washing system or a combination flotation/water washing system. A screening or coarse cleaning stage or stages can be utilized to remove contaminants such as glass, stone, metal and staples. A centrifugal cleaning stage or stages can be utilized to remove light weight materials such as plastics. Typical deinking processes are described in Fergusen, L. D., "Deinking Chemistry: part 1" July 1992 TAPPI Journal pp. 75 to 83; Ferguson, L. D., "Deinking Chemistry: part 2" August 1992 TAPPI Journal pp. 49–58; and Spielbauer, J. L. "Deinking System Overview", Voith, Inc. Appleton, Wis., pp. 1–9, which are incorporated herein by reference.

The preferred deinking process of the present invention comprises the steps of (a) converting the wastepaper to a pulp (preferably when utilizing an aqueous medium having from about 10% to about 14% by weight pulp on a dry weight basis); (b) contacting the pulp with a sufficient amount of deinking agent in an aqueous medium having a pH of from about 4 to about 9; and (c) removing ink (which is suspended or dispersed) from the pulp by flotation, water-washing, or a combination of flotation and water washing. The ink removal is typically by flotation, water washing or a combination of the two methods (preferably by flotation). During the contacting step, the pulp slurry generally can comprise from about 1.0% to about 6.0%, preferably from about 1.5% to about 5.5%, more preferably from about 2.5% to about 4.5% and most preferably from about 3.2% to about 3.8% pulp on a dry weight basis. Before addition, the pulp slurry's pH and temperature should be checked and, if needed, adjusted such that the pH and temperature of the slurry is within the activity ranges for pH and temperature (preferably within the optimal activity ranges) of the enzyme component of the deinking agent. Preferably after the deinking agent has been added to the pulp slurry and an adequate activation period has been completed, the pH and/or temperature are adjusted via conventional means, e.g., the addition of buffers or addition of heat, for a sufficient period of time to denature the enzyme component of the deinking agent. Preferably the pH and/or temperature are raised to about 9 for pH and/or about 55° C. for the temperature to denature the enzyme component. Increasing the pH beyond 9 can cause alkaline darkening and should be avoided.

As previously indicated, the deinking agent of the present invention can be included in the aqueous liquor (e.g., water) into which the wastepaper is initially pulped; into the aqueous pulp produced after the wastepaper is pulped; or into the flotation cell. Preferably, the deinking agent is incorporated after the wastepaper has been pulped.

The deinking can be conducted in the presence of additional chemicals however it is preferred that the chemicals used consist essentially of the deinking agent, buffers and optionally additional surfactants to aid in the flotation and/or washing steps. Peroxide can be included if desired, however an advantage of the invention is that it is usually unnecessary and is therefore not preferred.

EXAMPLES

Example I

The following is an example of a laboratory scale deinking process in which xerographically printed paper is recycled using the deinking agent of present invention:

Sample Preparation To provide a uniform ink concentration in the pulper, a sheet of paper with a known ink concentration is xerographically reproduced multiple times. The identical sheets are then twice passed through a mechanical paper shredder.

Hydrapulping Hot tap water (50°–54° C.) is added to a Formax™ 1800H Adirondack hydrapulper. The xerographic paper is then added to reach a pulp consistency of 14% of pulp fiber by weight of the total aqueous medium. Pulping is conducted at ambient pH (about 9) until the xerographic paper is thoroughly defibered (about 15 minutes).

Intermediate Reactor After pulping, a large sample is diluted to about 3.5% by weight pulp consistency and added to a two liter jacketed reactor. The pH is adjusted to about 6.5 using a 10% solution of $H_2SO_4$. The temperature of the pulp slurry is raised to about 55° C. At a point of uniform mixing and constant pH and temperature, 0.2% by weight InkMaskter™ 750 and 190 ml/ton Novo Nordisk enzyme SP342 on a dry fiber weight basis are added and well mixed at a constant rate for about 20 minutes. After mixing, the pH is adjusted to 9 with a 15.2% NaOH solution to denature the enzyme.

Flotation Deinking The pulp is then diluted to about 1% by weight by taking 1429g of about 3.5% consistency pulp and diluting with hot tap water to a final volume of about five liters. The 1% slurry is then added to a Denver Flotation Cell, Model D-1, having a five liter capacity. The pH is then adjusted to about 8.8–9.2 with NaOH. InkMaskter™750 at about 0.2% (by weight) is added to the float cell and premixed for about two minutes at an agitation rate of about 2100 rpm. Air is introduced at three liters per minute and continued at that rate for about three minutes. The float rejects are collected from the cell by skimming the foam along the plane of the weir in a consistent manor. The rejects are saved for yield calculations. The slurry remaining in the float cell is mixed for about 30 seconds with no air and used as the float accepts.

Sampling points A sample for Canadian Standard Freeness measurement is taken at the end of the intermediate reactor mixing time. Samples for handsheet preparation are taken after intermediate reactor mixing (float feed sample) and after flotation (float accepts sample). Triplicate sheets are prepared from each sample and are analyzed for dirt count. Two of the three handsheets prepared are then analyzed for brightness. The remaining sheet is used to measure tensile strength.

Handsheet Preparation The handsheets are made using a TAPPI Standard 159 mm diameter sheet former with stirrer, a TAPPI standard couch roll, and a Tappi standard couch plate as described in TAPPI Test Method T 205 om-88. This test method is followed with the following exceptions. The paper is defibered and prepared using the above procedure. The handsheets are pressed using a standard pneumatic press with gauge for about 1.5 minutes at about 50 psi. The sheets are dried in ring stacks overnight under constant temperature and constant humidity conditions.

Testing Canadian Standard Freeness testing is conducted following TAPPI Method T 228 os-58.

Brightness testing is performed in duplicate using the Technidyne Handybright brightness meter (based on percent light reflectance at about 457 nm). Each handsheet is cut into seven equal pie shaped slices then stacked on top of each other with the wire side up. The central portion of the top slice is measured and then placed at the bottom of the stack. The next slice is measured until all slices are measured. The final brightness value for each sample is determined by averaging 14 values (two sheets per sample or seven values per sheet). The standard deviation of the 14 values is typically in the range of from about 0.30 to about 0.75.

The handsheets are evaluated for ink content using an image analysis system. Fifty random fields having an area of approximately 35 $mm^2$ per field are evaluated per sheet so that the total area assessed is about 1750 $mm^2$ per sheet. Analysis is conducted using a Leco 2001 Image Analysis System. Dirt count, in parts per million, is determined for particles larger than about 0.0025 $mm^2$.

The handsheets are evaluated for strength properties using TAPPI Standard Test Method T494 om-88, "Tensile Breaking properties of Paper and Paperboard" with some modifications. Handsheets are kept in a constant temperature and humidity chamber until testing. Then, each sheet is cut into seven strips measuring about 15 mm×110 mm. Each strip is then evaluated using an Instron Tensile Strength testing machine and an average tensile index is determined.

The results of these tests are presented in Table I.

Example II

The procedure used in Example I is repeated with the exception that no enzyme or surfactant is added to the intermediate reactor. This provides a control experiment for the experiments involving the SP342 enzyme.

The results are presented in Table I.

Example III

The procedure followed in Example I is repeated with the exception that about 63 ml/ton of SP342 is added to the intermediate reactor. No surfactant is added to the intermediate reactor. The results are presented in Table I.

Example IV

The procedure followed in Example I is repeated with the exception that about 190 ml/ton SP342 is added to the intermediate reactor. No surfactant is added to the intermediate reactor. The results are presented in Table I.

Example V

The procedure followed in Example I is repeated with the exception that about 450 ml/ton SP342 is added to the intermediate reactor. No surfactant is added to the intermediate reactor.

The results are presented in Table I.

Example VI

The procedure followed in Example I is repeated with the exception that the pH in the intermediate reactor is adjusted to about 7.0 and Denimax L at about 253 ml/ton is substituted as the added enzyme. InkMaster™ 750 is added at about 0.2% to the intermediate reactor as well.

The results are presented in Table I.

Example VII

The procedure followed in Example I is repeated with the exception that the pH in the intermediate reactor is adjusted to about 7.0 and no surfactant or enzyme is added. This provides a control run for the experiments involving Denimax L enzyme.

The results are presented in Table I.

Example VIII

The procedure followed in Example I is repeated with the exception that the pH in the intermediate reactor is adjusted to about 7.0 and about 63 ml/ton Denimax L is added. No surfactant is added to the intermediate reactor.

The results are presented in Table I.

Example IX

The procedure followed in Example I is repeated with the exception that the pH in the intermediate reactor is adjusted to about 7.0 and about 253 ml/ton Denimax L is added. No surfactant is added to the intermediate reactor.

The results are presented in Table I.

Example X

The procedure followed in Example I is repeated with the exception that the pH in the intermediate reactor is adjusted to about 7.0 and about 450 ml/ton Denimax L is added. No surfactant is added to the intermediate reactor.

The results are presented in Table I.

Example XI

The following is an example of a pilot scale deinking process of the present invention:

A pilot scale trial is conducted using Novo Nordisk enzyme SP342 with InkMaster™ 750 vs. a control (no enzyme; InkMaster™ 750 only) to determine if enhanced dirt removal, as observed in the lab, can be achieved on this scale. The experiments involve repulping mixed office wastepaper (MOW)) with about 70% xerographic content at about 10% pulp consistency for about 30 minutes at ambient pH ( about 7.88) and at a temperature of about 50° C. The stock is then diluted to about 3.5% pulp consistency and the pH and temperature are adjusted to about 6.5 and about 55° C. respectively. At this point, about 2 lb/ton InkMaster™ 750 is added for the control run (Example I) and about 2 lb/ton InkMaster™ 750 plus 190 ml/ton SP342 is added for the enzyme run (Example II). This slurry is allowed to mix for about 20 minutes in each experiment. The slurry is then reduced to about 1% pulp consistency and an additional 1 lb/ton InkMaster 750 is added and mixed prior to flotation. The stock is then cycled for 6 passes through a Voith deinking flotation cell. After 6 passes, the float accepts are thickened on a sidehill screen. Brightness pads are made from samples taken at float cell feed, float cell accepts at half and full-time, and sidehill screen accepts. Brightness measurements are made in triplicate and indicate a two point gain with enzyme vs. the Control. Canadian Standard Freeness is measured in duplicate at the float cell feed following the 3.5% consistency step. The values are equivalent for both runs at 356 ml. Handsheets are made from the same stock as brightness pads for dirt count determination (five sheets/sample). Dirt counts are measured and percent dirt removal vs. process stage is evaluated. The run using enzyme plus surfactant treatment shows a 26% increase in dirt removal vs. the control for both half-time float accept and full-time float accept stages. A 31% increase in dirt removal is observed with enzyme treatment vs. the control at the side-hill accept stage.

Figure 1:
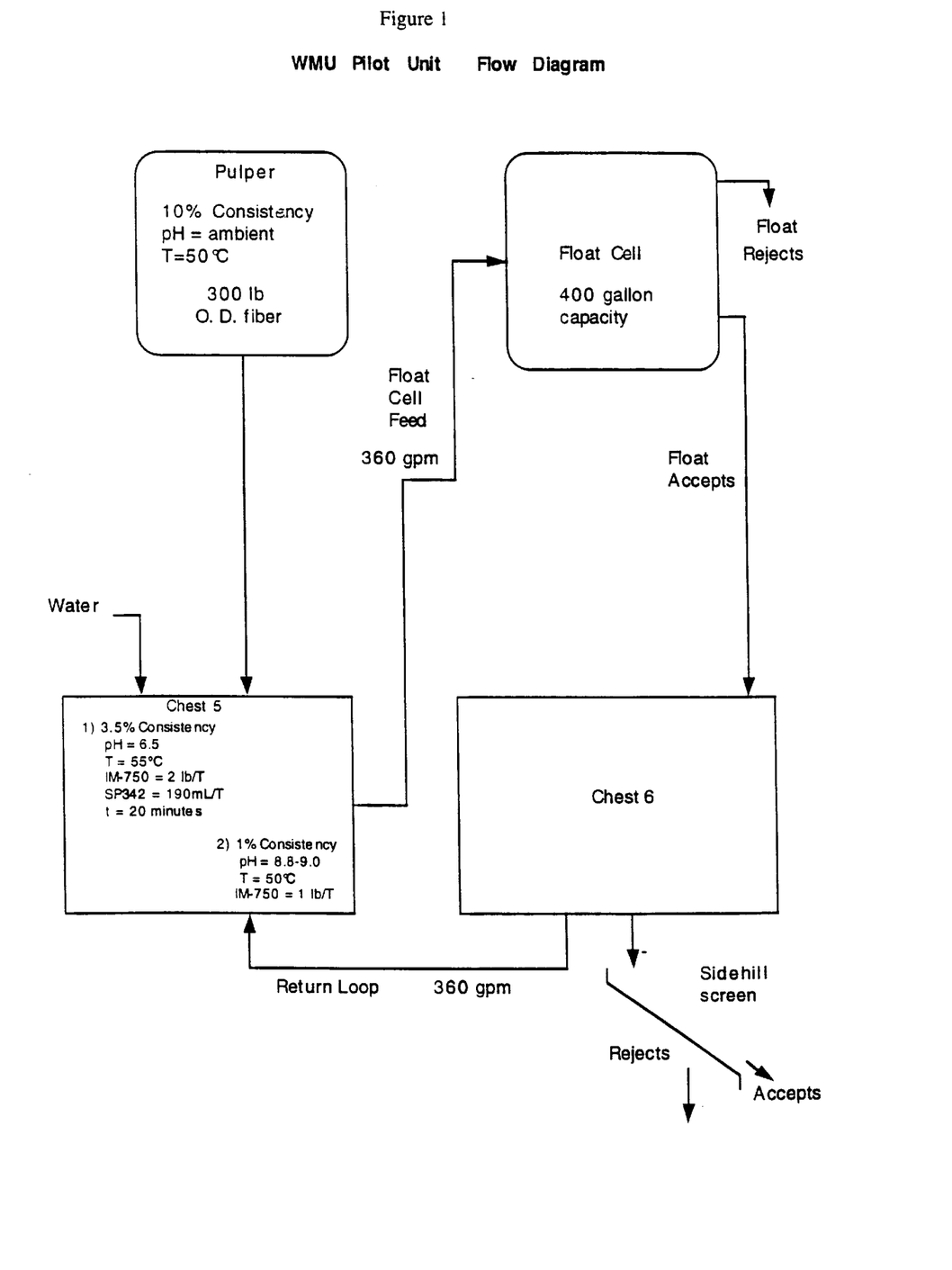
FIG. 1 is a diagram of the method used in Example XI.
Figure 2:
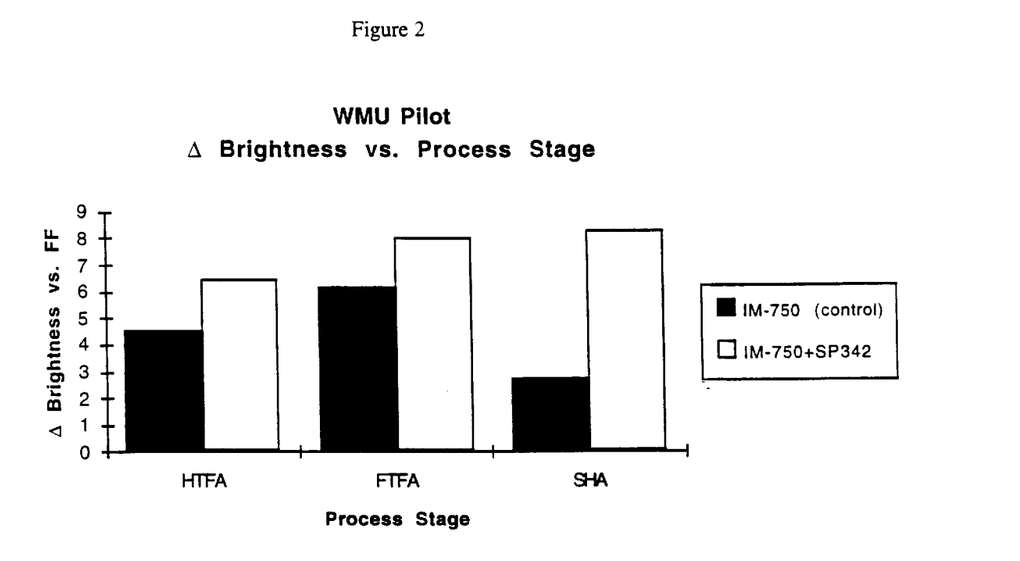
FIGS. 2 and 3 are comparison graphs of results obtained in Example XI when using Inkmaster 750 alone versus a combination of Inkmaster 750 and SP342 as the respective deinking agents.
Figure 3:
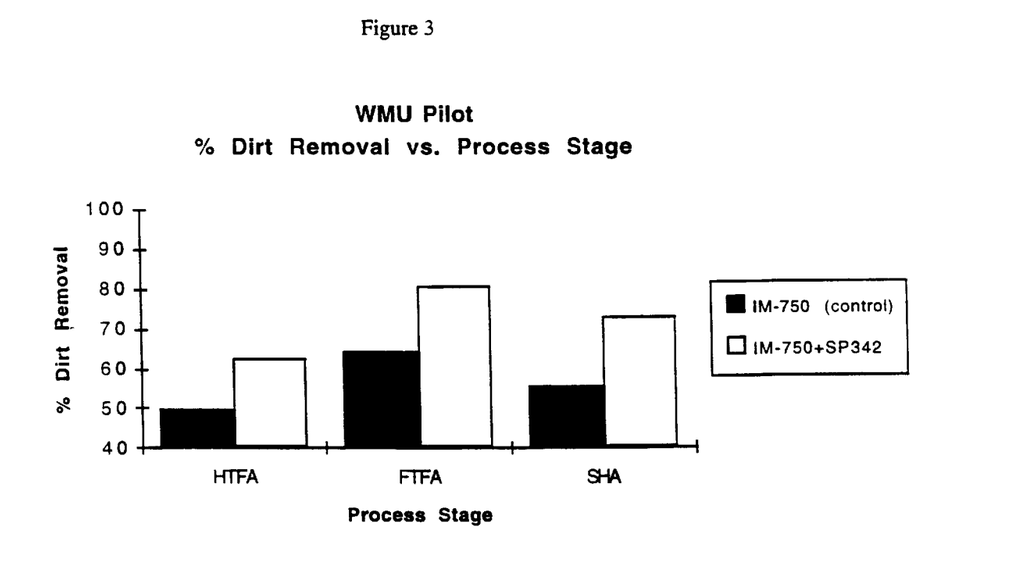

The results of these tests are presented in Table I, FIG. 1–3.

TABLE I

LABORATORY DEINKING RESULTS

| | EXAMPLE NO. | | | | |
|---|---|---|---|---|---|
| | I | II | III | IV | V |
| Enzyme | SP342, 190 mL/ton | Control | SP342, 63 mL/ton | SP342, 190 mL/ton | SP342, 450 mL/Tton |
| Surfactant | InkMaster ™ 750 | | | | |
| Dirt Removal (%) | 99.1 | 92.0 | 95.1 | 95.7 | 91.9 |
| Process Brightness Gain | 8 | 6.7 | 8.4 | 8 | 7.5 |
| Freeness (ml.) | 335 | 300 | 326 | 312 | 356 |
| Mean Tensile Index (N-M/g) | 29.1 | 28 | 30.4 | 28.9 | 30.9 |
| Δ Dirt Removal vs. Control | 7.1 | | 3.1 | 3.7 | −0.1 |
| Δ Brightness Gain vs. Control | 1.3 | | 1.7 | 1.3 | 0.8 |
| Δ Freeness vs. Control | 35 | | 26 | 12 | 56 |
| Δ Mean Tensile Index vs. Control | 1.1 | | 2.4 | 0.8 | 2.9 |

| | EXAMPLE NO. | | | | |
|---|---|---|---|---|---|
| | VI | VII | VIII | IX | X |
| Enzyme | Denimax L, 253 mL/ton | Control | Denimax L, 63 mL/ton | Denimax L, 253 mL/ton | Denimax L, 450 mL/ton |
| Surfactant | InkMaster ™ 750 | | | | |
| Dirt Removal (%) | 98.8 | 95.1 | 97.2 | 97.4 | 96.9 |
| Process Brightness Gain | 7.7 | 8.4 | 9.5 | 9.3 | 9.2 |
| Freeness (ml.) | 312 | 321 | 312 | 307 | 326 |
| Mean Tensile Index (N-M/g) | 28.9 | 29.4 | 31 | 30.4 | 30.2 |
| Δ Dirt Removal vs. Control | 3.7 | | 2.1 | 2.3 | 1.8 |
| Δ Brightness Gain vs. Control | −0.7 | | 1.1 | 0.9 | 0.8 |
| Δ Freeness vs. Control | −9 | | −9 | −14 | 5 |
| Δ Mean Tensile Index vs. Control | −0.5 | | 1.6 | 1 | 0.8 |

PILOT SCALE DEINKING RESULTS

| | EXAMPLE NO. XI | |
|---|---|---|
| Enzyme | Control | SP342, 190 mL/ton |
| Surfactant | InkMaster ™ 750, 2 lb/ton | InkMaster ™ 750, 2 lb/ton |
| Half-time Dirt Removal (%) vs. Float Feed | 49.6 | 62.6 |
| Full-time Dirt Removal (%) vs. Float Feed | 64.2 | 80.8 |
| Half-time Brightness Gain vs. Float Feed | 4.6 | 6.5 |
| Full-time Brightness Gain vs. Float Feed | 6.2 | 8.1 |
| Avg. Freeness (mL) | 356 | 356 |

Example XII

The procedure followed in example I is repeated with the exceptions that the intermediate reactor and float cell volumes are increased to 4 liter and 12 liter respectively, that 0.05% Inkmaster™ 730 is used in the intermediate reactor and flotation steps and that sampling points are at 0.5 minute intervals during flotation and that only ink removal by dirt count measurement is assessed. Ink removal results are presented in Table II.

Example XIII

The procedure followed in example XII is repeated with the exceptions that no enzyme is added to the intermediate reactor, thereby, providing a control experiment. Ink removal results are presented in Table II.

Example XIV

The procedure followed in example I is repeated with the exceptions that the intermediate reactor and float cell volumes are increased to 4 liter and 12 liter respectively, that 0.025% Alkamide® DC-212/S is used in the intermediate reactor and flotation steps and that sampling points are at 0.5 minute intervals during flotation and that only ink removal by dirt count measurement is assessed. Ink removal results are presented in Table II.

Example XV

The procedure followed in example XIV is repeated with the exceptions that no enzyme is added to the intermediate reactor, thereby, providing a control experiment. Ink removal results are presented in Table II.

Example XVI

The procedure followed in example I is repeated with the exceptions that the intermediate reactor and float cell volumes are increased to 4 liter and 12 liter respectively, that 0.05% Alkamide® C-5 is used in the intermediate reactor and float steps and that sampling points are at 0.5 minute intervals during flotation and that only ink removal by dirt count measurement is assessed. Ink removal results are presented in Table II.

Example XVII

The procedure followed in Example XVI is repeated with the exception that no enzyme is added to the intermediate reactor, thereby, providing a control experiment. Ink removal results are presented in Table II.

TABLE II

| | Ink Removal (%) | | | | | |
|---|---|---|---|---|---|---|
| Flotation Time (min) | Example XII | Example XIII | Example XIV | Example XV | Example XVI | Example XVII |
| 0.5 | 58.3 | 54.8 | 47.8 | 50.6 | 48.9 | 46.7 |
| 1.0 | 78.7 | 70.1 | 71.8 | 67.9 | 63.3 | 69.3 |
| 1.5 | 83.0 | 79.6 | 83.8 | 82.1 | 77.9 | 76.1 |
| 2.0 | 91.0 | 87.9 | 89.6 | 88.5 | 85.8 | 82.0 |
| 2.4 | 94.0 | 92.1 | 91.8 | 89.8 | 87.6 | 84.7 |

Example XVIII

Figure 4:
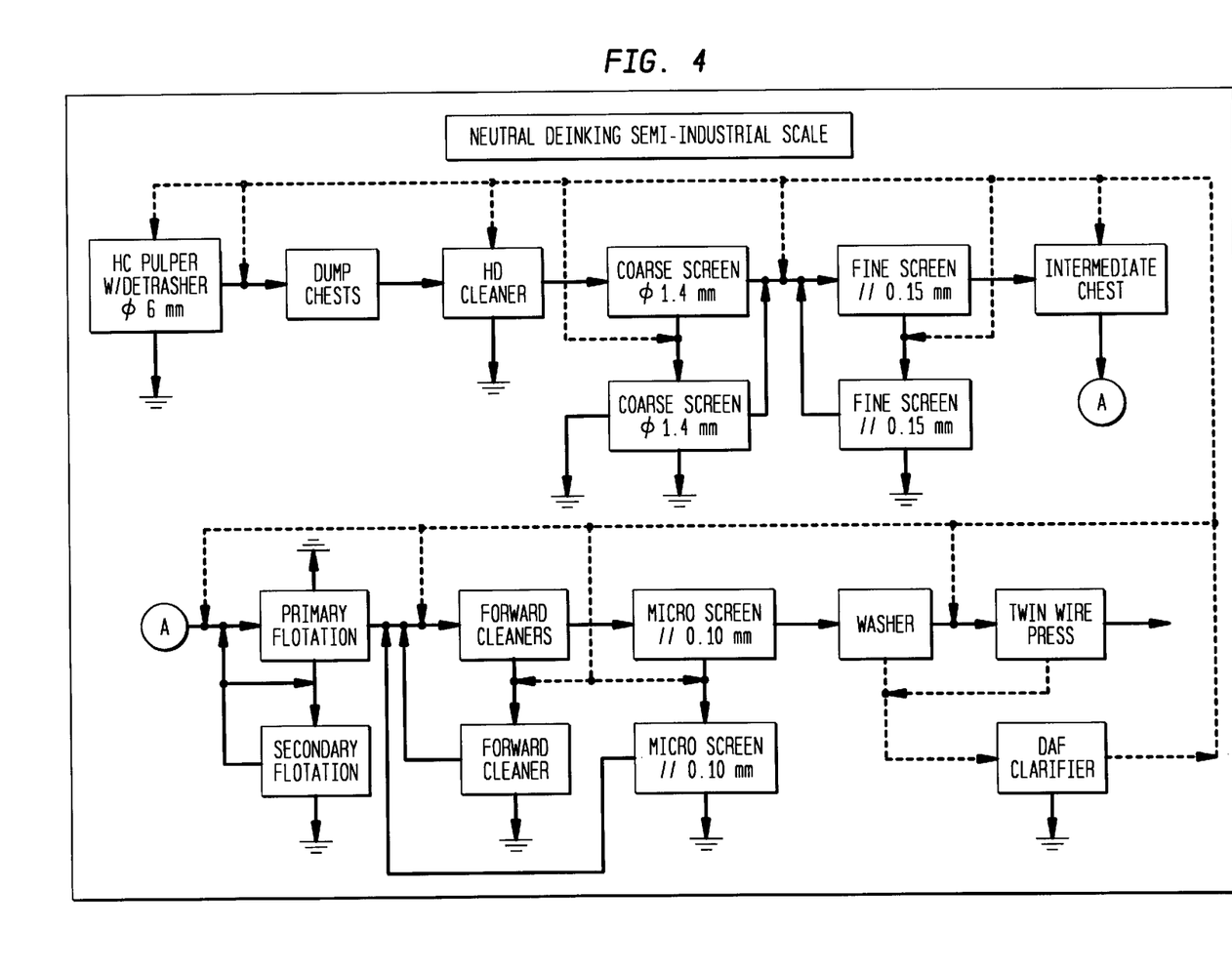
FIG. 4 is a diagram of the method used in Example XVII.

A semi-industrial scale trial is conducted using Novo Nordisk enzyme SP-342 with InkMaster® 750 during the pulping stage vs. a control (no enzyme; InkMaster® 750 only in pulping stage) to determine if improved deinking performance, and specifically, enhanced dirt removal resulting from altering the particle size of the ink, can be achieved on this scale. The flowchart for these experiments is shown in FIG. 4. The experiments involve repulping mixed office wastepaper (MOW) which is a mixture of 65% white laser ledger and 35% colored MOW. The 35% colored MOW component is approximately 90% colored material and the remaining 10% of this component includes ONP (old newsprint), OMG (old magazine), and unbleached brown bags. The groundwood content of the total wastepaper mixture is approximately 10%.

About 6000 lb. (air dried) of wastepaper is repulped at about 16% consistency for about 40 minutes at a neutral pH of 7.0 (adjusted with either NaOH or H2SO4) and at a temperature of 55° C. About 2.5 lb./ton paper of InkMaster® 750 (0.125%) is added to the pulper for the control run (Run 1) and about 2.5 lb./ton paper of InkMaster® 750 (0.125%) plus 300 mL/ton of paper of Novo Nordisk SP-342 cellulase enzyme (0.037%) is added to the pulper for the surfactant/enzyme run (Run 2). Following the pulping stage, the material is then pumped via a detrasher having a 6 mm screen plate into a dump chest where the consistency is reduced to about 4%.

Each batch is then pumped through high density cleaning (1.4 mm holes) and coarse screening (0.15 mm slots) stages. The pulp is further diluted to about 1% consistency in an intermediate chest prior to flotation. Flotation consists of primary flotation with reject froth vacuum followed by secondary flotation. Flotation accepts next proceed through centrifugal cleaning and micro-screening (0.1 mm slots).

The pulp is further processed by washing and thickening into wet-lap with a twin-wire press. Wash and press filtrates are clarified in a dissolved air flotation (DAF) unit and DAF clarified effluent is used as dilution water in each stage of the process.

Figure 5:
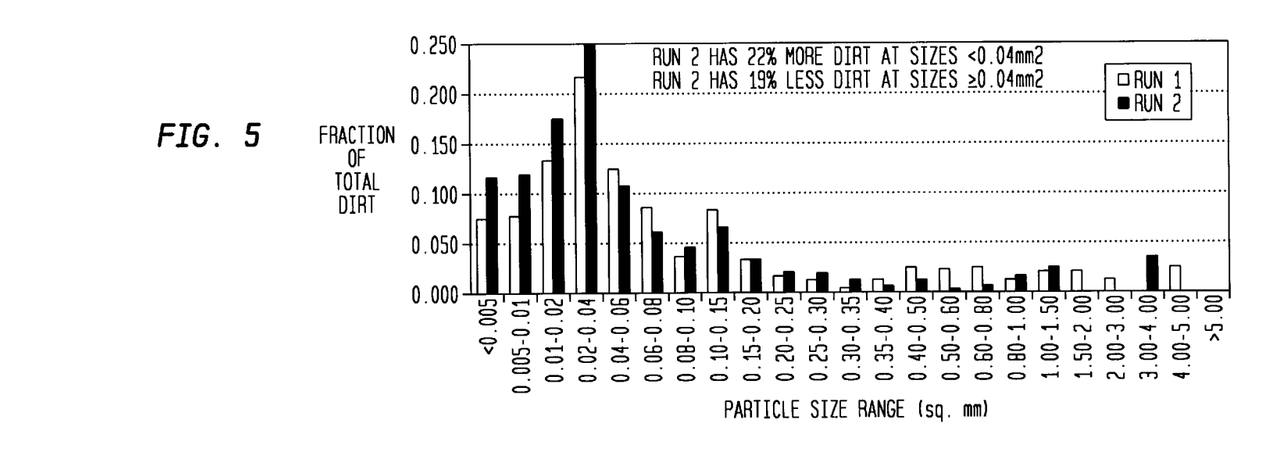
FIGS. 5 and 6 are comparison graphs of results obtained in Example XVIII when using Inkmaster 750 alone versus a combination of Inkmaster 750 and SP342 as the respective deinking agents.
Figure 6:
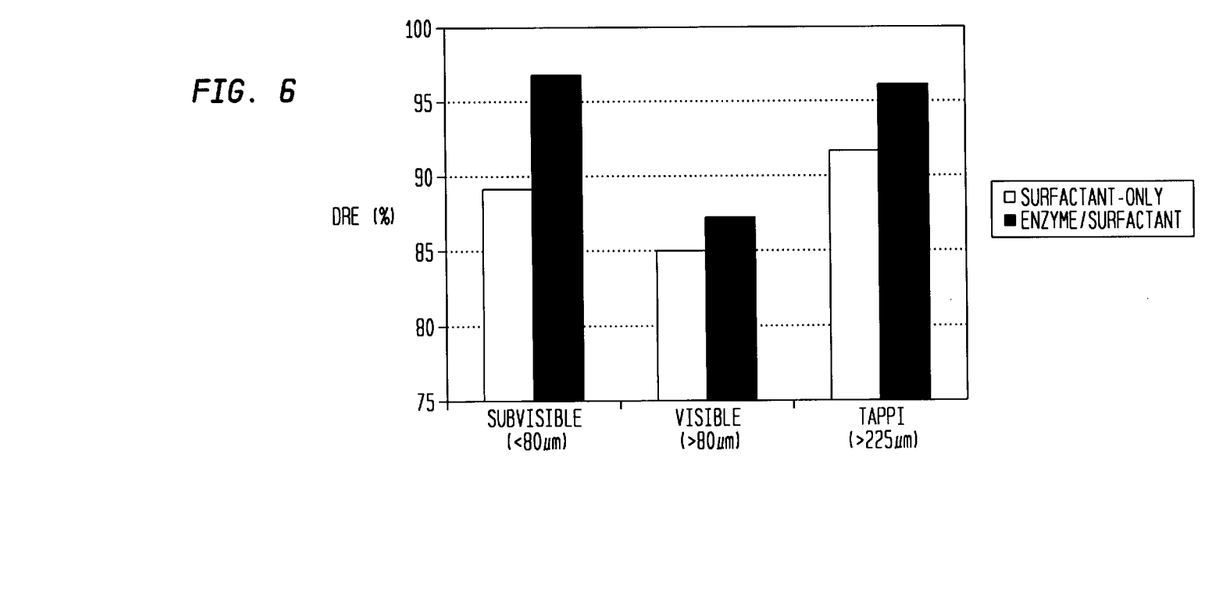

TAPPI standard handsheets are made from samples taken following pulping (flotation feed) and following flotation (float accepts). Dirt count is measured by optical scanning at three particle size (P) ranges: P<80 μm, P>80 μm, and P>225 μm and percent dirt removal is evaluated. The run using surfactant plus enzyme treatment (Run 2) shows the highest dirt removal achieved (97% for P<80 μm, 87% for P>80 μm, and 96% for P>225 μm). The results of these tests are presented in FIGS. 5 and 6.

The preferred embodiments have been described in detail herein above for the purpose of illustration only. It will be apparent to a practitioner of ordinary skill in the art that various modifications could be made to the above described examples without departing from the spirit and scope of the invention as defined in the claims set forth hereinafter.

What is claimed is:

1. A process for deinking office wastepaper comprising the steps of:
   a) converting office wastepaper papers comprising a majority of xerographically printed or laser printed paper containing thereon ink having a mean particle size of greater than 250 microns prior to pulping to a pulp;
   b) contacting the pulp with a deinking agent consisting essentially of:
      i) an enzyme active at a pH of from about 4 to about 9; and
      ii) a nonionic surfactant selected from the group consisting of
         a) a fatty alcohol having a carbon number of from about 8 to about 22, alkoxylated with ethylene oxide and propylene oxide of the formula

R—O—(CH2CH2O)$_x$—(CH2CH(CH3)—O)$_y$—H;

wherein R is a straight-chain or branched alkyl group having a carbon number of from about 8 to about 22, x represents the number of oxyethylene groups per molecule and is in the range of from about 5 to about 25, and y represents the number of oxypropylene groups per molecule and is in the range of from about 2 to about 10;
         b) a fatty alcohol having a carbon number of from about 8 to about 22, alkoxylated with ethylene oxide and propylene oxide of the formula:

R—O—(CH2CH2O)$_x$—(CH2CH(CH3)—O)$_y$—(CH2CH2O)$_x$—(CH2CH(CH3)—O)$_y$—H;

wherein R is a straight-chain or branched alkyl group having a carbon number of from about 8 to about 22, x represents the number of oxyethylene groups per molecule and is in the range of from about 2 to about 25, and y represents the number of oxypropylene groups per molecule and is in the range of from 0 to about 10;
         c) a fatty acid having a carbon number of from about 8 to about 22, alkoxylated with ethylene oxide and propylene oxide of the formula:

R—C(O)O—(CH2CH2O)$_x$—(CH2CH(CH3)—O)$_y$—H;

wherein R is a straight-chain or branched alkyl group having a carbon number of from about 8 to about 22, x represents the number of oxyethylene groups per molecule and is in the range of from about 3 to about 25, and y represents the number of oxypropylene groups per molecule and is in the range of from about 2 to about 15;

d) an aromatic alcohol having alkyl chain(s) with a carbon number of from about 8 to about 20, alkoxylated with ethylene oxide of the formula:

wherein R and R' is H or an alkyl group and the alkyl is branched or straight-chain having a carbon number of from about 8 to about 14, x is the number of oxyethylene groups per molecule and is in the range of from about 1 to about 20;

e) a fatty amide of alkanolamide of the formula:

wherein R' and R" are H or CH2CH2OH or CH2CH(CH₃)—OH and R is a fatty alkyl group having a carbon number of from about 8 to about 20;

f) an alkoxylated fatty acid amide of alkanolamide of the formula:

wherein R is a fatty alkyl group having a carbon number of from about 8 to about 20, and x represents the number of oxyethylene groups per molecule and is in the range of from about 2 to about 10; and g) an ethoxylated fatty alcohol of the formula:

wherein R is a fatty alcohol and x represents the number of oxyethylene groups per molecule and is in the range of from about 1 to about 20; and h) an ethylene oxide/propylene block copolymer of formula wherein m and n are the number of oxypropylene groups per molecule and are in the range of from about 10 to about 25 and p is the number of oxyethylene groups per molecule and is in the range of from about 5 to about 25 and mixtures thereof;

in an aqueous medium having a pH of from about 4 to about 9 to form a pulp slurry containing ink particles, wherein after carrying out step (b) at least about 85 percent of the ink particles in the pulp slurry have their mean particle size reduced to between about 50 and about 225 microns; and c) removing the ink particles from the pulp slurry of step (b) by flotation or a combination of flotation and water washing.

2. The method according to claim 1 wherein the enzyme is active at a pH of about 4 to about 8.

3. The method according to claim 2 wherein the enzyme is active at a pH of about 6 to about 7.5.

4. The method according to claim 1 wherein the enzyme is a cellulase.

5. The method according to claim 1 wherein after pulping at least about 90 percent of the ink particles have their mean particle size reduced to between about 50 and about 225 microns.

6. The method according to claim 5 wherein after pulping at least about 95 percent of the ink particles have their mean particle size reduced to between about 50 and about 225 microns.

7. A method for deinking office wastepaper papers comprising a majority of xerographically printed or laser printed paper containing thereon ink having a mean particle size of greater than 250 microns prior to pulping comprising the steps of:

a) converting the office wastepaper to a pulp in water such that the resulting aqueous medium consists essentially of from about 10% to about 14% on a dry weight basis pulp and the remainder water;

b) diluting the aqueous medium with water until the aqueous medium consists essentially of from about 1% to about 6% on a dry weight basis pulp and the remainder water;

c) contacting the aqueous medium for a sufficient amount of time with a sufficient amount of deinking agent consisting essentially of:

i) an enzyme active at a pH of from about 4 to about 9; and ii) a nonionic surfactant selected from the group consisting of a) a fatty alcohol having a carbon number of from about 8 to about 22, alkoxylated with ethylene oxide and propylene oxide of the formula wherein R is a straight-chain or branched alkyl group having a carbon number of from about 8 to about 22, x represents the number of oxyethylene groups per molecule and is in the range of from about 5 to about 25, and y represents the number of oxypropylene groups per molecule and is in the range of from about 2 to about 10;

b) a fatty alcohol having a carbon number of from about 8 to about 22, alkoxylated with ethylene oxide and propylene oxide of the formula:

wherein R is a straight-chain or branched alkyl group having a carbon number of from about 8 to about 22, x represents the number of oxyethylene groups per molecule and is in the range of from about 2 to about 25, and y represents the number of oxypropylene groups per molecule and is in the range of from 0 to about 10;

c) a fatty acid having a carbon number of from about 8 to about 22, alkoxylated with ethylene oxide and propylene oxide of the formula:

wherein R is a straight-chain or branched alkyl group having a carbon number of from about 8 to about 22, x represents the number of oxyethylene groups per molecule and is in the range of from about 3 to about 25, and y represents the number of oxypropylene groups per molecule and is in the range of from about 2 to about 15;

d) an aromatic alcohol having alkyl chain(s) with a carbon number of from about 8 to about 20, alkoxylated with ethylene oxide of the formula:

wherein R and R' is H or an alkyl group and the alkyl is branched or straight-chain having a carbon number of from about 8 to about 14, x is the number of oxyethylene groups per molecule and is in the range of from about 1 to about 20;

e) a fatty amide of alkanolamide of the formula:

wherein R' and R" are H or $CH_2CH_2OH$ or $CH_2CH(CH_3)$—OH and R is a fatty alkyl group having a carbon number of from about 8 to about 20;

f) an alkoxylated fatty acid amide of alkanolamide of the formula:

wherein R is a fatty alkyl group having a carbon number of from about 8 to about 20, and x represents the number of oxyethylene groups per molecule and is in the range of from about 2 to about 10; and g) an ethoxylated fatty alcohol of the formula:

wherein R is a fatty alcohol and x represents the number of oxyethylene groups per molecule and is in the range of from about 1 to about 20 and mixtures thereof;

wherein said aqueous medium has a pH of from about 4 to about 9 and a temperature consistent with the optimal activity of the enzyme to form a pulp slurry containing ink particles, wherein after carrying out step (c) at least about 85 percent of the ink particles in the pulp slurry have their mean particle size reduced to between about 50 and about 225 microns;

d) adjusting the pH or temperature of the pulp slurry of step (c) to denature the enzyme; and e) removing the ink particles from the pulp slurry of step (d) by flotation or a combination of flotation and water washing.

8. A method according to claim 7 wherein the enzyme is active at a pH of from about 4 to about 8.

9. The process according to claim 8 wherein the enzyme is active at a pH of 6 to 7.5.

10. A method according to claim 7 wherein the enzyme is a cellulase.

11. A method according to claim 7 wherein the aqueous medium of the contacting step has a temperature of from about 40° C. to abut 65° C. and the deinking agent remains in contact with the aqueous medium for from about 5 minutes to about 90 minutes.

* * * * *